US012414021B2

(12) United States Patent
Yeung et al.

(10) Patent No.: US 12,414,021 B2
(45) Date of Patent: Sep. 9, 2025

(54) METHOD AND APPARATUS FOR IMPROVING DATA TRANSMISSION

(71) Applicant: Pismo Labs Technology Limited, Kowloon (HK)

(72) Inventors: Yu Yeung, Kowloon (HK); Kwan Man Kit, New Territories (HK)

(73) Assignee: Pismo Labs Technology Limited, Kowloon (HK)

( * ) Notice: Subject to any disclaimer, the term of this patent is extended or adjusted under 35 U.S.C. 154(b) by 0 days.

(21) Appl. No.: 17/912,483

(22) PCT Filed: Oct. 26, 2021

(86) PCT No.: PCT/IB2021/059865
§ 371 (c)(1),
(2) Date: Sep. 16, 2022

(87) PCT Pub. No.: WO2023/073400
PCT Pub. Date: May 4, 2023

(65) Prior Publication Data
US 2024/0214890 A1 Jun. 27, 2024

(51) Int. Cl.
*H04W 36/08* (2009.01)
*H04W 16/28* (2009.01)

(52) U.S. Cl.
CPC ........... *H04W 36/08* (2013.01); *H04W 16/28* (2013.01)

(58) Field of Classification Search
CPC ......... H04W 36/0007; H04W 36/0016; H04W 36/0033; H04W 36/26; H04W 4/06; H04W 36/0011; H04W 36/08
See application file for complete search history.

(56) References Cited

U.S. PATENT DOCUMENTS

2009/0219904 A1* 9/2009 Khairmode ............ H04B 15/02
370/338
2009/0253438 A1* 10/2009 Chater-Lea .......... H04B 7/0408
455/562.1

(Continued)

FOREIGN PATENT DOCUMENTS

CN 107994917 A 5/2018
CN 112469004 A 3/2021
WO 2017036107 A1 3/2017

OTHER PUBLICATIONS

International Search Report in International Application No. PCT/IB2021/059865, mailed on Jul. 28, 2022.

(Continued)

*Primary Examiner* — Sun Jong Kim
(74) *Attorney, Agent, or Firm* — Hershkovitz & Associates, PLLC; Abe Hershkovitz

(57) ABSTRACT

Methods and systems for improving connectivity between a network node and a base station during data communication over a cellular network are described. The network node comprises a first plurality of WCMs. The method includes identifying, by the network node, a first base station connected to a second plurality of WCMs. The second plurality of WCMs include all or part of the first plurality of WCMs. After that, a WCM is selected from the second plurality of WCMs to maintain a connection with the first base station. The rest of the second plurality WCMs are disconnected from the first base station. The disconnected WCMs are reconnected in a manner so that each of the second plurality of WCMs becomes connected to a different base station or to the same base station over different frequency bands.

18 Claims, 13 Drawing Sheets

(56) References Cited

U.S. PATENT DOCUMENTS

| | | | |
|---|---|---|---|
| 2009/0264119 A1* | 10/2009 | De Pomian | H04W 24/08 |
| | | | 455/424 |
| 2017/0208603 A1* | 7/2017 | Goel | H04W 72/56 |
| 2018/0146365 A1 | 5/2018 | Dhanapal et al. | |
| 2020/0267637 A1* | 8/2020 | Veloso | H04B 17/318 |
| 2021/0112554 A1* | 4/2021 | Li | H04W 72/0453 |
| 2021/0193012 A1* | 6/2021 | Jung | H01Q 1/243 |
| 2022/0052731 A1* | 2/2022 | Legg | H04B 7/022 |

OTHER PUBLICATIONS

Written Opinion of the International Search Authority in International Application No. PCT/IB2021/059865, mailed on Jul. 28, 2022.
English Language Abstract of CN 107994917 A (May 4, 2018).
English Language Abstract of CN 112469004 A (Mar. 9, 2021).

* cited by examiner

| 1001 | 1002 | 1003 | 1004 | 1005 | 1006 |
|---|---|---|---|---|---|
| Cycle | WCMs | Frequency band that WCMs connecting to | WCM status | Collective WCM status | Blacklisted frequency bands |
| 1 (a) | WCM 201a<br>WCM 201b<br>WCM 201c | B1 - WCM 201a | WCM 201a - connect<br>WCM 201b - disconnect<br>WCM 201c - disconnect | WCM 201a - connected<br>WCM 201b - disconnected<br>WCM 201c - disconnected | B1 |
| 2 (b) | WCM 201b<br>WCM 201c | B2 - WCM 201b<br>B1 - WCM 201c | WCM 201b - connect<br>WCM 201c - disconnect | WCM 201a - connected<br>WCM 201b - connected<br>WCM 201c - disconnected | B1<br>B2 |
| 3 (c) | WCM 201c | B3 - WCM 201c | WCM 201c - connect | WCM 201a - connected<br>WCM 201b - connected<br>WCM 201c - connected | B1<br>B2<br>B3 |

Fig. 10

METHOD AND APPARATUS FOR IMPROVING DATA TRANSMISSION

TECHNICAL FIELD

The present invention generally relates to the field of cellular communication, and more particularly, to methods and systems for improving connectivity between a network node and a base station during data communication over a cellular connection.

BACKGROUND OF INVENTION

The present invention relates in general to data transmission, in particular, to improve the performance of the data connection over a cellular network.

A network node having a Subscriber Identity Module (SIM) card is able to connect with a network, for example, the Internet, via a mobile network associated with a SIM card. To enhance data transmission, the network node may have more than one SIM card so that the network node becomes capable of performing data communication over the Internet via more than one mobile network in order to increase the bandwidth of data transmission.

If the SIM cards within the network node are provided by one Mobile Network Operator (MNO), more than one wireless communication modules (WCMs) of the network node may connect to the same base station through the same frequency band with a corresponding antenna. In such instances, data transmission rate may be reduced due to the limited bandwidth of the frequency band.

SUMMARY OF THE INVENTION

The present invention features methods and systems for improving data transmission at a network node. In one exemplary embodiment, the network node comprises a first plurality of WCMs. Each of the first plurality of WCMs comprises at least one rotatable and tiltable antenna element to facilitate communication with base stations operated by mobile network operators. Each of the first plurality WCM is capable of establishing at least one connection with at least one base station.

In one implementation, the network node identifies a first base station connected to a second plurality of WCMs. The second plurality of WCMs includes all or part of the first plurality of WCMs. After that, a WCM is selected from the second plurality of WCMs to maintain a connection with the first base station. Afterwards, the rest of the second plurality WCMs except the selected WCM is/are disconnected from the first base station.

The disconnected WCM(s) is/are then connected to any base station except the first base station. To connect the disconnected WCMs to different base stations, the directions of the antenna elements attached to the disconnected WCMs are oriented in a manner so that the disconnected WCM connects to at least one base station except the first base station. In one implementation, the directions of the antenna elements may be changed based on the current geographical area of the network node.

In one exemplary aspect, the network node further comprises a database that stores the characteristics of each antenna element connected to the first plurality of WCMs. In another exemplary aspect, the database further comprises current geographical coordination information of the network node, WCM group policy information, frequency band blacklist table information and other related information.

BRIEF DESCRIPTION OF THE DRAWINGS

FIG. 10 illustrates a blacklist table for one of the embodiments of the present invention;

DETAILS OF THE INVENTION

Figure 1:
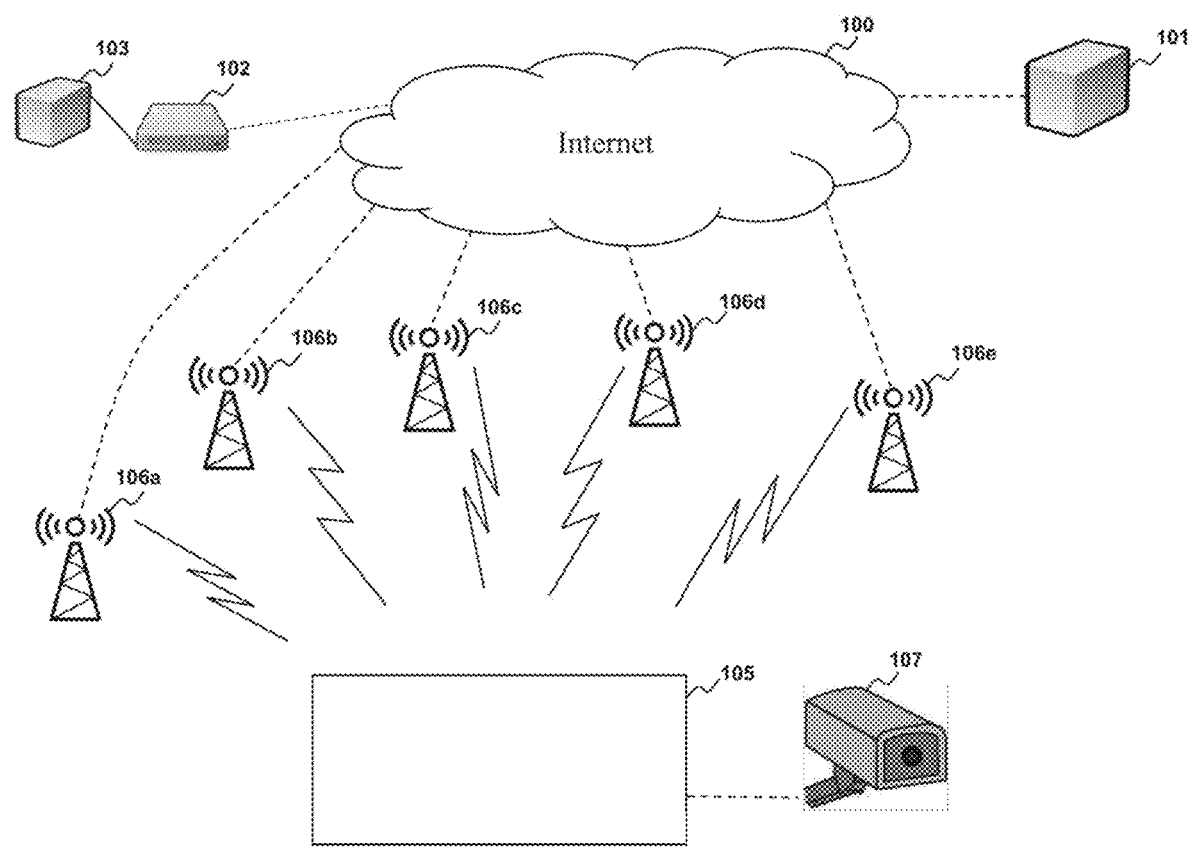
FIG. 1 illustrates an exemplary network environment according to the embodiments of the present invention.

The ensuing description provides preferred exemplary embodiment(s) only, and is not intended to limit the scope, applicability or configuration of the invention. Rather, the ensuing description of the preferred exemplary embodiment(s) will provide those skilled in the art with an enabling description for implementing a preferred exemplary embodiment of the invention. It is being understood that various changes may be made in the function and arrangement of elements without departing from the spirit and scope of the invention as set forth in the appended claims.

Specific details are given in the following description to provide a thorough understanding of the embodiments. However, it will be understood by one of the ordinary skills in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments may be described as a process that is depicted as a flowchart, a flow diagram, a data flow diagram, or a block diagram. Although a flowchart may describe the operations as a sequential process, many of the operations can be performed in parallel or concurrently. In addition, the order of the operations may be re-arranged. A process is terminated when its operations are completed but could have additional steps not included in the figure. A process may correspond to a method, a function, a procedure, a subroutine, a subprogram, etc. When a process corresponds to a function, its termination corresponds to a return of the function to the calling function or the main function.

Embodiments, or portions thereof, may be embodied in program instructions operable upon a processing unit for performing functions and operations as described herein. The program instructions making up the various embodiments may be stored in a storage medium.

Embodiments of the present invention are related to the use of a computer system for implementing the techniques described herein. In an embodiment, the inventive processing units may reside on a machine such as a computer platform. According to one embodiment of the invention, the techniques described herein are performed by a computer system in response to the processing unit executing one or more sequences of one or more instructions contained in the volatile memory. Such instructions may be read into the volatile memory from another computer-readable medium. Execution of the sequences of instructions contained in the volatile memory causes the processing unit to perform the process steps described herein. In alternative embodiments, hard-wired circuitry may be used in place of or in combination with software instructions to implement the invention. Thus, embodiments of the invention are not limited to any specific combination of hardware circuitry and software.

The program instructions making up the various embodiments may be stored in a storage medium. Moreover, as disclosed herein, the term "storage medium" may represent one or more devices for storing data, including read-only memory (ROM), programmable read-only memory (PROM), erasable programmable read-only memory (EPROM), random access memory (RAM), magnetic RAM, core memory, floppy disk, flexible disk, hard disk, magnetic tape, CD-ROM, flash memory devices, a memory card and/or other machine-readable mediums for storing information.

The term "machine-readable medium" includes, but is not limited to portable or fixed storage devices, optical storage devices, wireless channels and various other mediums capable of storing, containing or carrying instruction(s) and/or data. A machine-readable medium can be realized by virtualization, and can be a virtual machine-readable medium including a virtual machine-readable medium in a cloud-based instance. Furthermore, embodiments may be implemented by hardware, software, firmware, middleware, microcode, hardware description, languages, or any combination thereof. When implemented in software, firmware, middleware or microcode, the program code or code segments to perform the necessary tasks may be stored in a machine-readable medium such as storage medium.

The term computer-readable medium, main memory, secondary storage, or other storage medium as used herein refers to any medium that participates in providing instructions to a processing unit for execution. The processing unit reads the data written in the primary storage medium and writes the data in the secondary storage medium. Therefore, even if the data written in the primary storage medium is lost due to a momentary power failure and the like, the data can be restored by transferring the data held in the secondary storage medium to the primary storage medium. The computer-readable medium is just one example of a machine-readable medium, which may carry instructions for implementing any of the methods and/or techniques described herein. Such a medium may take many forms, including but not limited to, non-volatile media, volatile media, and transmission media. Non-volatile media includes, for example, optical or magnetic disks. Volatile storage includes dynamic memory. Transmission media includes coaxial cables, copper wire and fiber optics. Transmission media can also take the form of acoustic or light waves, such as those generated during radio-wave and infrared data communications.

A volatile storage may be used for storing temporary variables or other intermediate information during execution of instructions by a processing unit. A non-volatile storage or static storage may be used for storing static information and instructions for the processor, as well as various system configuration parameters.

The storage medium may include a number of software modules that may be implemented as software codes to be executed by the processing unit using any suitable computer instruction type. The software code may be stored as a series of instructions or commands, or as a program in the storage medium.

Various forms of computer readable media may be involved in carrying one or more sequences of one or more instructions to the processor for execution. For example, the instructions may initially be carried on a magnetic disk from a remote computer. Alternatively, a remote computer can load the instructions into its dynamic memory and send the instructions to the system that runs one or more sequences of one or more instructions.

A processing unit executes program instructions or code segments for implementing embodiments of the present invention. Furthermore, embodiments may be implemented by hardware, software, firmware, middleware, microcode, hardware description languages, or any combination thereof. When implemented in software, firmware, middleware, or microcode, the program instructions to perform the necessary tasks may be stored in a computer-readable storage medium.

A processing unit may be a complex programmable logic device (CPLD), a field-programmable gate array (FPGA), a central processing unit (CPU), a microprocessor, a microcontroller, a digital signal processor (DSP), any combination of those devices, or any other circuitry configurable to execute the program instructions for implementing the embodiments disclosed herein.

A system bus may carry signals between a master component (e.g., a processing unit) and peripheral components, or among the peripheral components. A system bus may include a plurality of signal lines connecting the components inside or outside of a device. A system bus disclosed herein may be realized using any of several types of bus structures, including a memory bus, a peripheral bus, or a local bus using any of a variety of bus architecture.

A network interface may be implemented by a standalone electronic component or may be integrated with other electronic components. A network interface may have no network connection or at least one network connection depending on the configuration. A network interface may be an Ethernet interface, a frame relay interface, a fiber optic interface, a cable interface, a Digital Subscriber Line (DSL) interface, a token ring interface, a serial bus interface, a universal serial bus (USB) interface, Firewire interface, Peripheral Component Interconnect (PCI) interface, cellular network interface, etc.

A network interface may connect to a wired or wireless access network. An access network may carry one or more network protocol data. A wired access network may be implemented using Ethernet, fiber optic, cable, DSL, frame relay, token ring, serial bus, USB, Firewire, PCI, or any material that can pass information. A wireless access network may be implemented using infrared, High-Speed Packet Access (HSPA), HSPA+, Long Term Evolution (LTE), WiMAX, General packet radio service (GPRS), Global System for Mobile Communications (GSM), Enhanced Data rates for GSM Evolution (EDGE), Code division multiple access (CDMA), Wi-Fi, CDMA2000, Wideband CDMA (WCDMA), Time Division CDMA (TD-SCDMA), BLUETOOTH, WiBRO, Evolution-Data Optimized (EV-DO); Digital Enhanced Cordless Telecommunications (DECT); Digital AMPS (IS-136/TDMA); Integrated Digital Enhanced (iDEN) or any other wireless technologies. For example, a network interface may be used as a local area network (LAN) interface or a wide area network (WAN) interface.

As disclosed herein the term "wireless communication module" may represent a transceiver module to provide network capabilities to a power controller or power controller server using 3G, GPRS or GPS modules, through wires or through an Ethernet cable. The wireless communication module lows a processing unit to obtain user information and the communications port of the wireless communication module can connect to a personal computer or other power controller or power controller server (PCS) through wires or wirelessly by using serial bus or Ethernet or using 2G/3G/4G or LTE technology. The wireless communication module can be used as a network interface for applications that require data to be shared between a power controller and an intelligent device such as a host computer and/or a server.

FIG. 1 is a network diagram of an illustrative network environment according to the embodiments of the present invention. The network comprises network node 105. Network node 105 may comprise a plurality of antenna elements to establish cellular connection as a wide area network (WAN) connection. The cellular connection is established through a wireless connection established between a wireless communication module (WCM) of network node 105 and a base station. Network node 105 may house or be externally connected to the plurality of WCMs. The base station is one of the plurality of base stations 106a-106e (collectively named base stations 106). Server 101 and network device 102 are connected to Internet 100 over a wired or wireless connection. Server 103 connects with Internet 100 via network device 102.

Each of the plurality of base stations 106 may be a fixed base station and may also be referred to as access point, node, and evolved node which may provide wireless communication for a particular geographic area using cellular technologies. Base station 106a-106e may be operated by the same or different MNOs. For example, base stations 106a-106b may be operated by T-Mobile®, base stations 106c-106d may be operated by AT&T® and base stations 106e may be operated by Verizon®.

In one example, network node 105 connects with Internet 100 via establishing wireless connection between at least one of the plurality of WCMs housed in or connected to network node 105 and at least one of the plurality of base stations 106.

In one variant, one or more external devices are connected to network node 105. The external devices may be any Internet of Things (IoT) devices, such as servers, sensors, appliances, motor assemblies, outdoor shading systems, cameras, lighting assemblies, microphones, computing devices, etc. For illustrative purposes, video surveillance camera 107 is connected to network node 105.

In one variant, each of the plurality of SIMs connected to the respective WCMs may have its own Access Point Name (APN) configuration. Therefore, each of the plurality of SIMs may allow respective WCMs to connect to base stations 106 based on APN configuration.

Figure 2A:
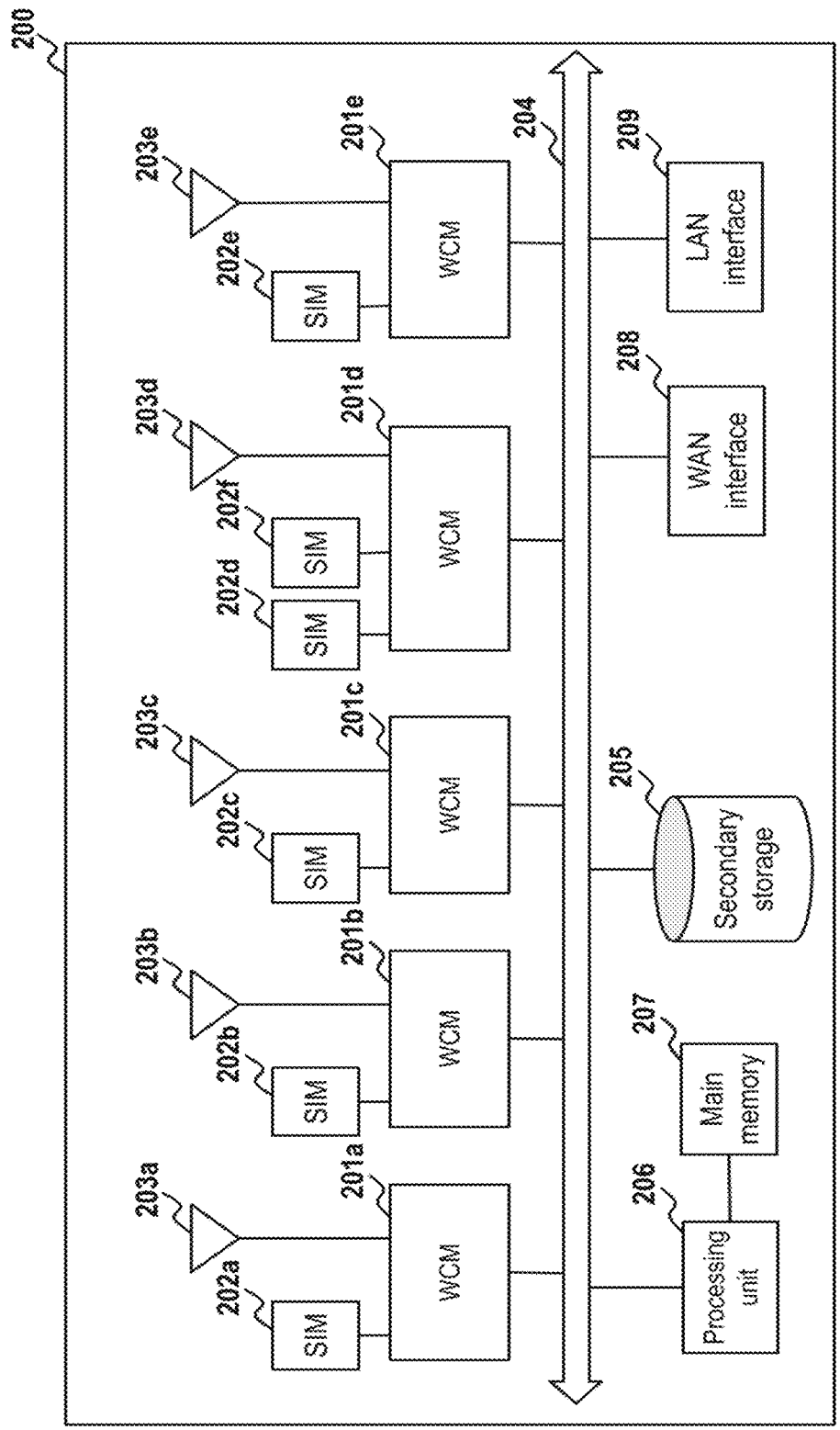
FIG. 2A illustrates a block diagram of an exemplary network node according to the embodiments of the present invention.

FIG. 2A illustrates a block diagram of an exemplary network node according to the embodiments of the present invention. The exemplary network node is network node 200. Network 200 is similar to network node 105. For illustrative purposes, network node 200 comprises secondary storage 205, main memory 207, at least one processing unit, such as processing unit 206, system bus 204, at least one WAN interface, such as WAN interface 208, and at least one LAN interface, such as LAN interface 209. Network node 200 further comprises a plurality of WCMs 201a-201e (collectively named WCMs 201). Each of the plurality of WCMs is connected to at least one SIM and at least one antenna element of a plurality of antenna elements 203a-203e (collectively named antenna elements 203). For example, WCM 201a is connected to SIM 202a and antenna element 203a, and WCM 201b is connected to SIM 202b and antenna element 203b. Processing unit 206 is connected to main memory 207. Processing unit 206 communicates with secondary storage 205, LAN interface 209, WAN interface 208, and WCMs 201 via system bus 204. Each of the plurality of SIMs 202a-201f (collectively named SIMs 202) may be housed in a SIM card holder, which is connected to a SIM interface and a corresponding WCM directly. Each of the plurality of antenna elements 203 is connected to corresponding WCMs 201 directly.

In one variant, each of the plurality of SIMs 202 may be an Embedded Universal Integrated Circuit Card (eUICC), which is also referred to as embedded SIM (eSIM). An eSIM may be provisioned with one or more eSIM profiles. An eSIM profile contains all the necessary information for dialing into a cellular network to enable a corresponding device to obtain telecommunication services from the MNO of the cellular network. For example, each eSIM profile may contain one or more information of the following: a unique International Mobile Subscriber Identity (IMSI) number that authenticates a subscriber to a cellular network, an Integrated Circuit Card Identifier (ICCID), a Mobile Station International Subscriber Directory Number (MSISDN), cellular network-specific data, and security authentication information. An eSIM profile may be used to perform the same functions similar to a removable SIM or a SIM card. An eSIM profile may also be referred to as an electronic SIM. Processing unit 206 may use the eSIM profile to perform authentication.

It is possible that a plurality of SIMs are connected to a WCM. As illustrated in FIG. 2A, SIMs 202d and 202f are connected to WCM 201d. In another example, all WCMs 201 housed in network node 200 may only be connected to one SIM. Therefore, SIMs 202d and 202f connected to WCM 201d as shown in FIG. 2A is for illustrative purposes only.

Each of the plurality of antenna elements 203 may be a multiple-input multiple-output (MIMO) antenna, a multiple-input single-output (MISO) antenna, a single-input multiple-output (SIMO) antenna, or a single-input single-output (SISO) antenna.

In one variant, one or more SIM cards may be housed in an external device connected to network node 200. In another variant, the one or more SIM cards may be housed in WCMs 201. In such cases, WCMs 201 may be housed in an external device rather than network node 200. For example, the external device may comprise a Universal Serial Bus (USB) port, Long-Term Evolution (LTE) modem and network node 200 connects to the external device through a USB interface. Network node 200 is capable of connecting to one or more external devices.

In one variant, at least one antenna element of antenna elements 203 is capable of being used in outdoor environments. For illustration, antenna element 203a has a waterproof structure so that antenna element 203a is adapted to be used in outdoor environments.

There is no limitation on the number of WCMs and the number of antenna elements that are connected to network node 200. In one example, network node 200 may have ten WCMs 201 connected to ten antenna elements 203 respectively. In another example, network node 200 may have five WCMs 201 connected to eight antenna elements 203 respectively. For simplification, each WCM shown in network node 200 is connected to one antenna element only.

In one variant, network node 200 may have other communication modules, instead of WCMs 201, for example, an Ethernet interface, a frame relay interface, a fiber optic interface, a cable interface, a Digital Subscriber Line (DSL) interface, a token ring interface, a serial bus interface, a universal serial bus (USB) interface, Firewire interface, Peripheral Component Interconnect (PCI) interface for transmission of data packets.

Figure 2B:
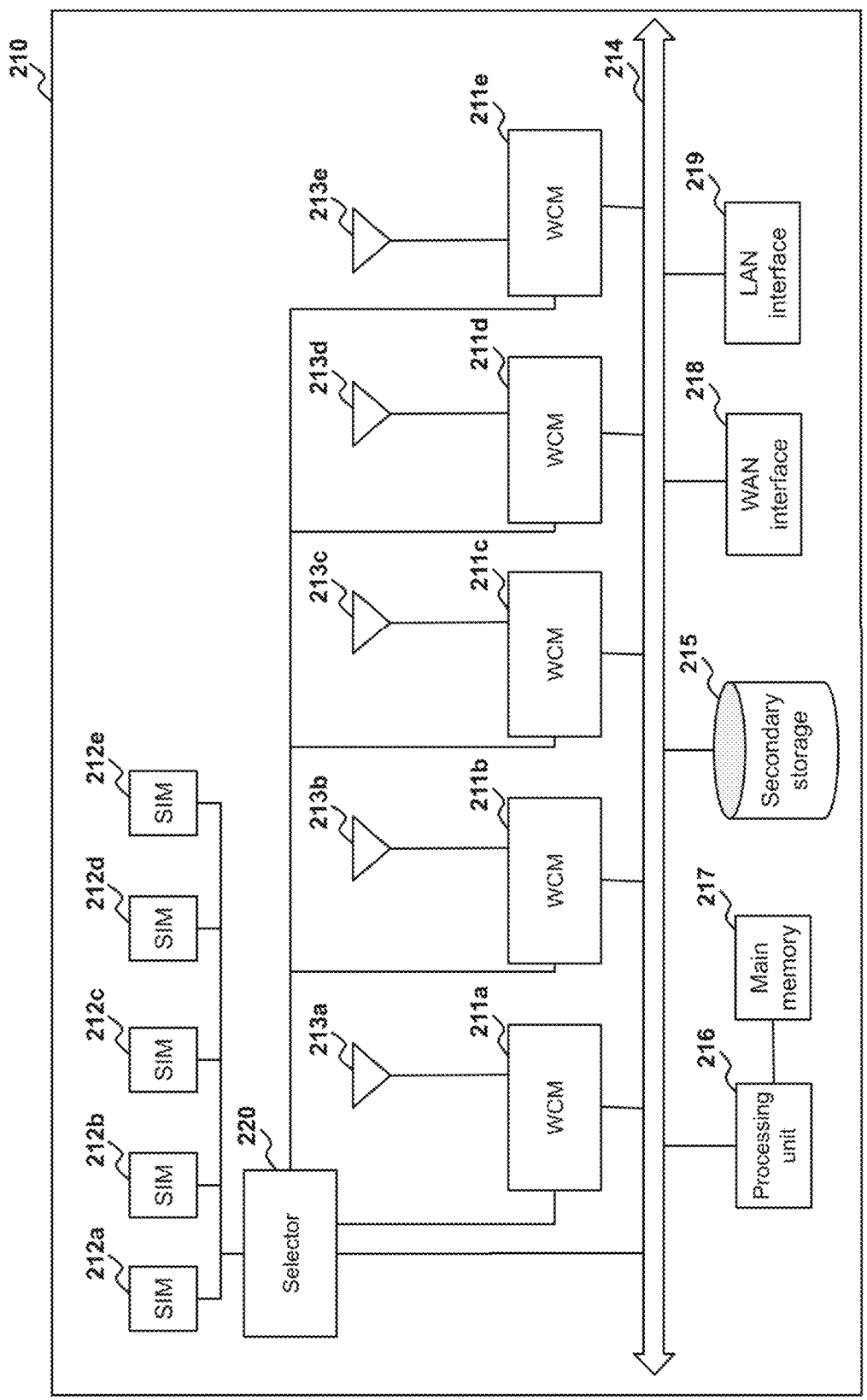
FIG. 2B illustrates another block diagram of an exemplary network node according to the embodiments of the present invention.

FIG. 2B illustrates a block diagram of a network node according to an exemplary embodiment of the present invention. Similar to network node 200 shown in FIG. 2A, network node 210 comprises secondary storage 215, main memory 217, at least one processing unit, such as processing unit 216, system bus 214, at least one WAN interface, such as WAN interface 218, at least one LAN interface, such as LAN interface 219, a plurality of WCMs 211a-e (collectively named WCMs 211), a plurality antenna elements 213a-e connected to the plurality of WCMs and a plurality of SIMs 212a-e.

The difference between network node 200 and network node 210 is that network node 210 further comprises selector 220. In network node 210, the plurality of SIMs 212 are connected to the plurality of WCMs 213 through selector 220. Each of the plurality of WCMs 211 is capable of selecting any SIM from the plurality of SIMs 212. Selector 220 may be implemented by a complex programmable logic device (CPLD), a field-programmable gate array (FPGA), a multiplexer (MUX) or other implementation for SIM selection.

Figure 2C:
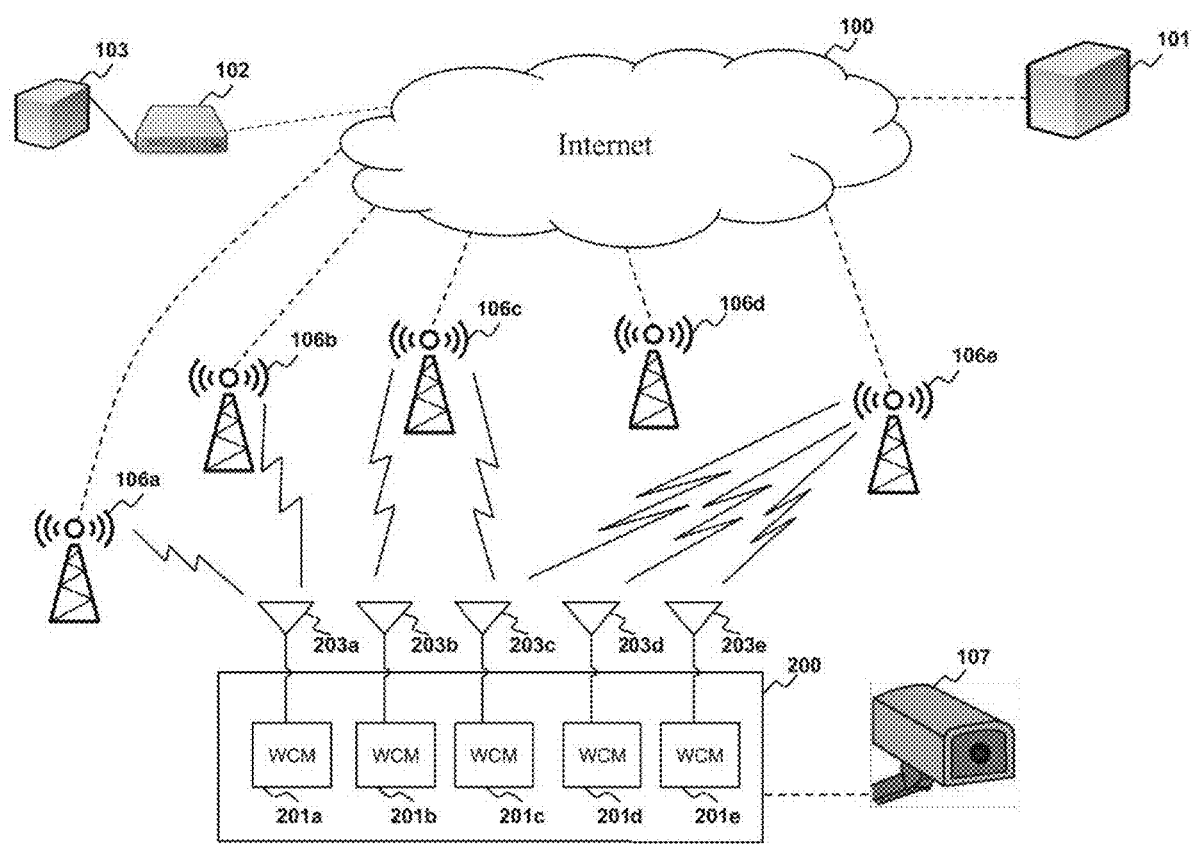
FIG. 2C illustrates an exemplary network environment according to the embodiments of the present invention.

FIG. 2C illustrates an exemplary network environment according to the embodiments of the present invention. It is possible for each of the plurality of WCMs to connect to the same or different base stations 106. The base stations to which a WCM is to be connected are selected based on certain criteria. Details of the base station selection process will be discussed later.

For illustration purposes, each of the plurality of WCMs 201 may establish a wireless connection with at least one base station using at least one of the plurality of antenna elements 203. For example, in one scenario, WCM 201a coupled to antenna element 203a is connected to two base stations, such as base stations 106a and 106b at the same time. In another scenario, WCMs 201b and 201c coupled to antenna elements 203b and 203c are connected to the same base station, such as base station 106c. In another scenario, a base station, such as base station 106d is not connected to any of the plurality of WCMs 201. In another scenario, three WCMs 201c-e coupled to antenna elements 203c-e are connected to the same base station, such as base station 106e. In another exemplary scenario, a WCM may be connected to two antenna elements to connect with two base stations. There is no limitation on the number of base stations that an antenna element is capable of connecting to and there is also no limitation on the number of antenna elements that can be connected to a single base station.

Each of the plurality of WCMs 201 and 211 housed in network nodes 200 and 210 respectively may test and select a frequency band with the best performance for connection. If a network node identifies a plurality of frequency bands that are available to use, it is difficult to determine which frequency band is under testing. Hence, the network node may indicate only one frequency band is available for each testing. For illustration purposes, different embodiments for testing the frequency band in network node 200 are discussed below according to the present invention. The embodiments and the variants applied in network node 200 are also applicable for network node 210.

Embodiment 1

Figure 3:
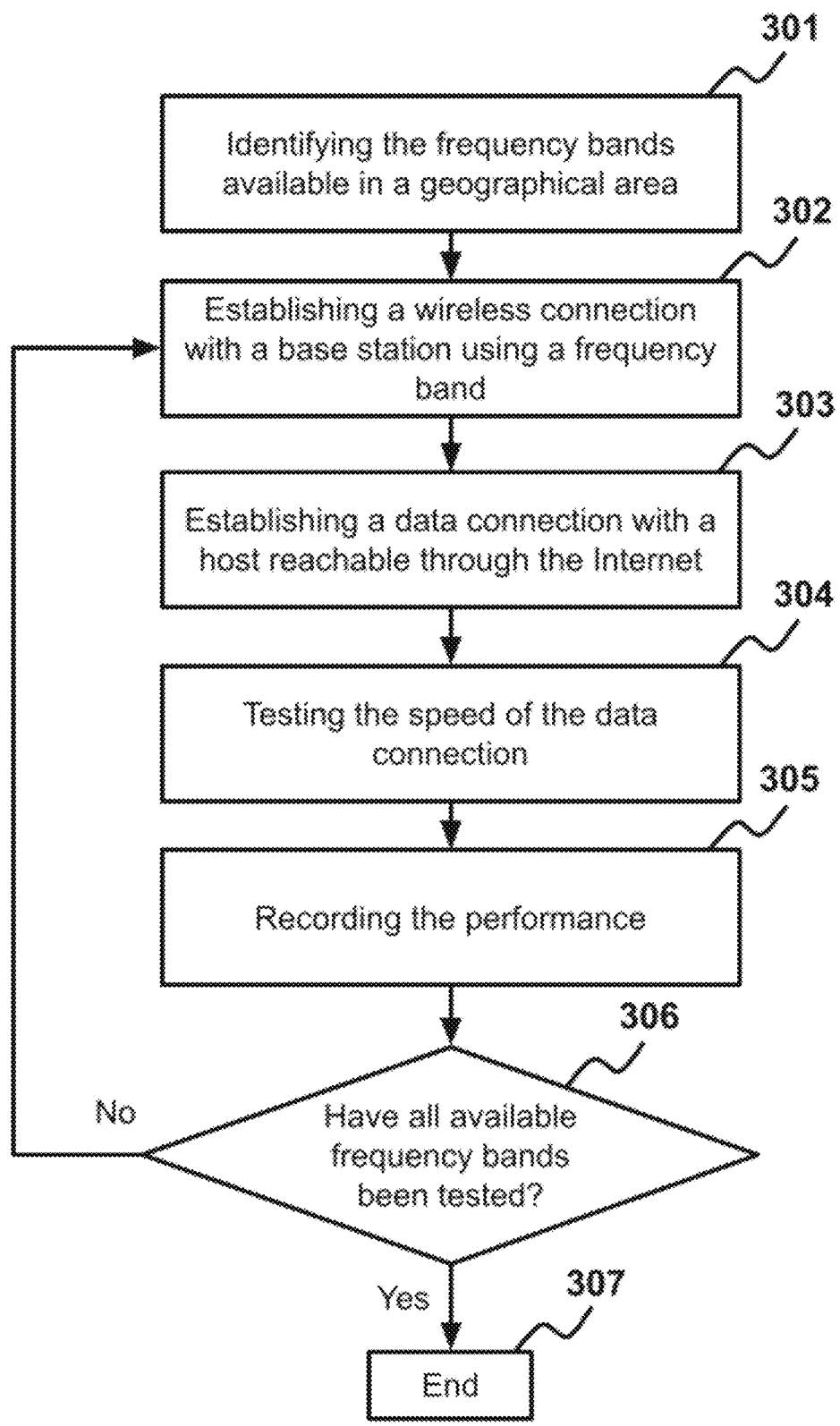
FIG. 3 is a flowchart illustrating one of the embodiments for testing the connection of all available frequency bands.

FIG. 3 illustrates a method for testing the connection of all available frequency bands according to the present invention. Network node 200 may select one SIM and one antenna element using one of the plurality of WCMs 201 for testing. Network node 200 may be capable of using different sets of frequency bands. Network node 200 may be required to support all carriers in its supported bands.

For illustrative purposes, each of the plurality of WCMs 201 in network node 200 and each of the plurality of WCMs 211 in network node 210 may support frequency bands B1, B2, B3, B4, B5, B7, B8, B19, B26, B29, B46, B48 and B66. There is no limitation that the frequency bands supported by each of the plurality of WCMs must be the same.

The same frequency bands supported by each of the plurality of WCMs is disclosed for illustrative purposes only.

In process 301, processing unit 206 identifies the available frequency bands in a geographical area where network node 200 is located. The available frequency bands must be the frequency bands supported by a WCM connected to network node 200, such as WCM 201a, and provided by an MNO corresponding to a SIM connected to WCM 201a. For example, WCM 201a is connected to SIM 202a. The MNO of SIM 202a is MNO T-Mobile®, which provides data connection to any connected devices through frequency bands B2, B4 and B12. Since frequency bands B12 is not supported by WCM 201a, the available frequency bands for WCM 201a are B2 and B4.

In process 302, network node 200 establishes a wireless connection using WCM 201a with a base station of MNO T-Mobile® through a selected frequency band. The selected frequency band is selected from the available frequency bands. The selected frequency band is set in WCM 201a through a web interface, a user interface (UI), an application programming interface (API), a command-line interface or a console. For example, AT command or Qualcomm MSM Interface (QMI) is used to set the frequency band in WCM 201a. Details of the QMI protocol will be discussed later.

In one example, the frequency bands may be selected in ascending order for testing. In another example, the frequency bands may be selected in descending order for testing. In another example, the frequency bands may be selected randomly for testing.

In process 303, WCM 201a establishes a data connection with a host reachable through the Internet over the selected frequency band. For example, WCM 201a may establish a data connection with server 101 reachable through the Internet over selected frequency band B2.

In process 304, processing unit 206 evaluates the performance of the data connection established in process 303. After that, in process 305, processing unit 206 records the performance in the form of a performance matrix. The performance matrix may be stored in secondary storage 205 of network node 200, or in a host reachable through Internet 100. The performance matrix comprises one or more of the following criteria: speed, latency, throughput, jitter, packet loss, interference levels, noise, signal strength, delay, etc. There is no limitation on the techniques that can be used to evaluate the performance of the data connection. One of the ordinary skilled in the art would appreciate that there are myriads of ways for evaluating the performance of a data connection. For example, the performance may be evaluated by sending an Internet Control Message Protocol (ICMP) message to the host and receiving an ICMP echo reply from the host.

For example, signal-to-noise ratio (SNR), Signal-to-noise and distortion ratio (SINAD), signal-to-interference ratio (SIR), signal-to-interference-plus-noise ratio (SINR), interference levels and/or receiver signal strength indicator (RSSI) levels for the selected frequency band are used for evaluating the performance matrix.

In process 306, processing unit 206 determines whether all of the available frequency bands have been tested or not. If all of the available frequency bands have been tested, processes terminate at process 307. If all of the available frequency bands have not been tested, process 302 is performed again and then the subsequent processes are iterated until all of the available frequency bands have been tested. The processes may be performed N times if the number of available frequency bands is N. For example, if only two available frequency bands B2 and B4 are identified in process 301, processes 302-306 may be performed two times.

Embodiment 2

The method of embodiment 1, further comprising means for performing the processes for all WCMs 201 housed in network device 200. Processes 302-306 illustrated in FIG. 3 may be performed N*M times if the number of available frequency bands for each SIM connected to all WCMs is N and the number of WCMs is M. There is no limitation on the number of available frequency bands for each SIM connected to WCMs 201. All SIMs 202 connected to each of the plurality of WCMs 201 have N available frequency bands are for illustrative purposes only.

In one example, only B2 and B4 are the available frequency bands for each of the SIMs 202 connected to WCMs 201. The MNOs of the SIMs connected to the plurality of WCMs 201a-201e may be the same or different. Therefore, 5 WCMs are required to be tested. Since 5 WCMs are needed to be tested with 2 available frequency bands, processes 302-306 illustrated in FIG. 3 may be performed (5×2) 10 times.

In another example, B2 and B4 are the available frequency bands for each of the SIMs 202a and 202b connected to WCMs 201a and 201b respectively, while B1, B2 and B4 are the available frequency bands for each of the SIMs 202c-e connected to WCMs 201c-e respectively. Hence, the processes 302-306 illustrated in FIG. 3 may be performed (2×2+3×3) 13 times.

Embodiment 3

The method of embodiment 1, further comprising means for performing the processes for all SIMs 202 connected to a WCM. Processes 302-306 illustrated in FIG. 3 may be performed N*P times if the number of available frequency bands for each SIM connected to the WCM is N and the number of SIMs connected to the WCM is P.

For example, B1, B2 and B4 are the available frequency bands for each of the SIMs 202d and 202f connected to WCM 201d. Therefore, processes 302-306 illustrated in FIG. 3 may be performed (3×2) 6 times for WCM 201d since two SIMs are connected to WCM 201d and each of the two SIMs has three available frequency bands.

In view of FIG. 2B, selector 220 is connected to five WCMs 211, as such, each of the plurality of SIMs 212 is capable of connecting any of the five WCMs. Thus, for each available frequency band of a SIM, process 302-306 may be performed 5 times. For example, when available frequency bands for each of the plurality SIMs 212 is N equal to 3, the number of SIMs 212 is P equal to 5 and the number of WCMs is M equal to 5, then, processes 302-306 illustrated in FIG. 3 may be performed N*P*M, (3×5×5) 75 times.

Embodiment 4

The method of embodiment 1, further comprising means for performing the processes for all antenna elements 203 connected to a WCM. Processes 302-306 illustrated in FIG. 3 may be performed N*Q times if the number of available frequency bands for each SIM connected to the WCM is N and the number of antenna elements connected to the WCM is Q.

For example, when B2 and B4 are the available frequency bands for SIM 202a connected to WCM 201a, processes 302-306 illustrated in FIG. 3 may be performed N*Q, (2×1) 2 times since only one antenna element is connected to WCM 201a.

Embodiment 5

The method of embodiment 1, further comprising means for performing the processes for different directions for an antenna element connected to a WCM. Processes 302-306 illustrated in FIG. 3 may be performed N*R times if the number of available frequency bands for each SIM connected to the WCM is N and the pointing directions of an antenna element connected to the WCM is R.

For example, when the number of pointing directions of antenna element 203a connected to WCM 201a is two and the number of available frequency bands for SIM 202a connected to WCM 201a is two, then processes 302-306 illustrated in FIG. 3 may be performed N*R, (2×2) 4 times.

Embodiment 6

The method of embodiment 1, further comprising means for performing the testing with different hosts for a WCM. Processes 302-306 illustrated in FIG. 3 may be performed N*S times if the number of available frequency bands for each SIM connected to the WCM is N and the number of hosts used for testing is S.

For example, when the number of hosts used for testing is five and the number of available frequency bands for SIM 202a connected to WCM 201a is two, then processes 302-306 illustrated in FIG. 3 may be performed N*S, (2×5) 10 times.

Embodiment 7

The method of embodiment 1, further comprising means for performing the testing in different time slots for a WCM. Processes illustrated in FIG. 3 may be performed N*T times if the number of available frequency bands for each SIM connected to the WCM is N and the number of time slots used for testing is T.

For example, when the test is to be performed every 10 minutes, the number of time slots per hour to perform processes 302-306 is 6 and the number of available frequency bands for SIM 202a connected to WCM 201a is two, therefore, processes 302-306 illustrated in FIG. 3 may be performed N*T, (2×6) 12 times per hour.

Embodiment 8

The method of embodiment 1, further comprising means for performing the processes in different geographical areas for a WCM. Processes illustrated in FIG. 3 may be performed N*G times if the number of available frequency bands for each SIM connected to the WCM is N and the number of geographical areas used for testing is G.

For example, when the number of geographical areas for testing is three and the number of available frequency bands for SIM 202a connected to WCM 201a is two, then processes 302-306 illustrated in FIG. 3 may be performed N*G, (2×3) 6 times.

Embodiment 9

The method of embodiment 1, further comprising means for performing any combination of the method of embodiments 2-8. In one variant, processes 302-306 illustrated in FIG. 3 are performed for all WCMs housed in network device 200. For example, when the number of WCMs housed in network node 200 M is equal to five, the number of SIMs connected to each of five WCMs P is equal to five, available frequency bands for each of the five SIMs N is equal to two and the number of antenna elements connected to each of five WCMs Q is equal to two, then processes 302-306 illustrated in FIG. 3 may be performed M*P*N*Q, (5×5×2×2) 100 times.

After testing all the aforementioned possibilities according to the embodiments, processing unit 206 may select a base station to establish a wireless connection. The base station is selected according to the performance recording in process 305.

In some exemplary scenarios, it is possible for more than one WCMs 201 housed in network node 200 is connected to the same base station through the same frequency band. In such cases, connectivity may be affected because of performing data communication using a plurality of WCMs over the same frequency bands at network node 200. Therefore, a method is disclosed for improving the connectivity of a network node according to the present invention.
Directional Antenna According to one embodiment of the present invention, network node 200 has at least one antenna element 203 arranged in a different direction from other antenna elements. For example, antenna element 203a may be mounted on one side of network node 200 and antenna elements 203b-e may be mounted on another side of network node 200. In another example, antenna element 203a may be mounted on a first side of network node 200, antenna element 203b may be mounted on a second side of network node 200, and antenna elements 203c-e may be mounted on a third side of network node 200. The user or the administrator may manually adjust the direction of the antenna elements via an input interface. The input interface may be a web interface, a user interface, an application programming interface or an input device such as a touch-sensitive surface, a pointing input device, a keypad, a keyboard, a stylus, a sensor or a joystick. Network node 200 may receive instructions from the user and/or administrator through the LAN or WAN interface.

Figure 4:
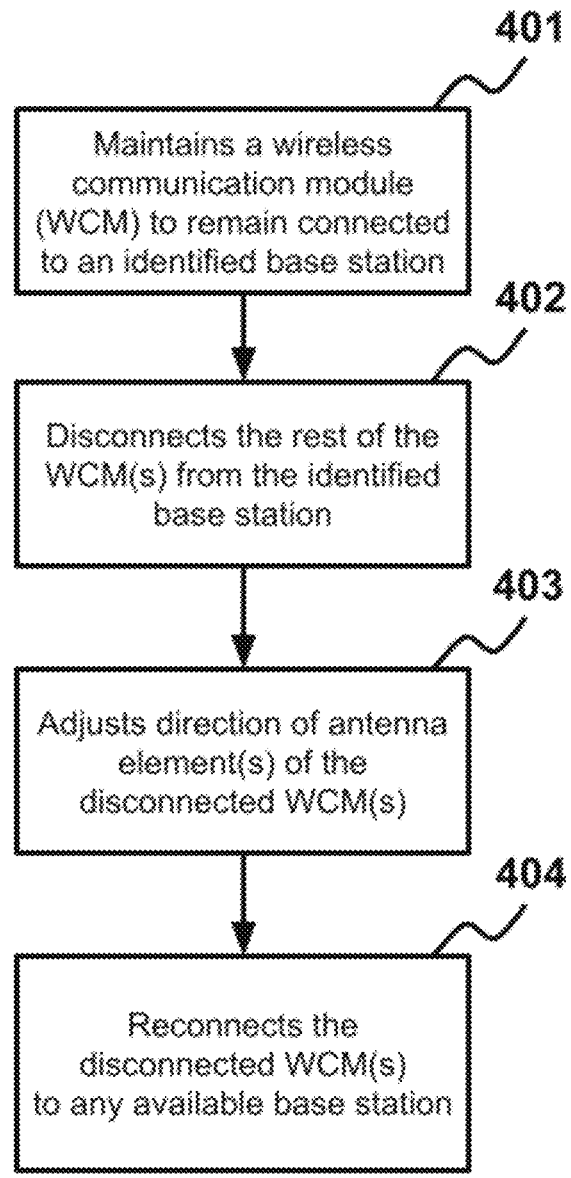
FIG. 4 is a flowchart illustrating a method for improving connectivity for a network node that is connected to an identified base station using more than one WCMs through the same frequency band.

FIG. 4 is a flowchart illustrating a method for improving connectivity for a network node that is connected to an identified base station using more than one WCMs through the same frequency band. As illustrated in FIG. 2C, three WCMs connected with antenna elements 203c-e housed in network node 200 are connected to base station 106e. If more than one WCMs connected to a single base station is identified, then the connectivity of the base station should be improved by maintaining only one WCM to remain connected with the base station. For example, base station 106e has been identified for being connected with more than one WCMs of network node 200.

In process 401, processing unit 206 selects a WCM from the plurality of WCMs 201c-e to maintain a connection between identified base station 106e and the selected WCM. The selected WCM is selected according to one or more of the following conditions: connectivity, performance and availability. For illustrative purposes, WCM 201c is selected by processing unit 206 to maintain the connection with identified base station 106e. In another variant, the selected WCM is selected randomly from a plurality of WCMs which are connected to the same base station.

In process 402, the remaining WCMs connected to identified base station 106e are disconnected. Since only WCMs 201c-e are connected to identified base station 106e, and WCM 201c is selected to maintain the connection with base station 106e. Hence, WCM 201d and 201e are disconnected from base station 106e.

In process 403, the direction of the antenna elements of disconnected WCMs 201d and 201e are adjusted to point in a different direction than the antenna element of WCM 201c. When adjusting the directions of the antenna elements of the disconnected WCMs, the directions of the antenna elements of the disconnected WCMs are adjusted in manner so that the antenna elements are able to detect different base stations than the base station from which the WCM are disconnected. The purpose of adjusting the directions of the antenna elements of the disconnected WCMs in such a manner is to increase the probability that the disconnected WCMs will connect to a different base station than a disconnected base station when disconnected WCMs are reconnected.

For example, antenna element 203d is adjusted to point in a different direction. In process 404, the disconnected WCMs are reconnected to at least one base station. The base station(s) to be connected to antenna elements 203d and 203e should be within the coverage area of antenna elements 203d and 203e.

In one variant, the method disclosed in FIG. 4 is performed based on one or more triggering events. For example, a triggering event occurs whenever processing unit 206 identifies a base station that is connected to more than one WCM. Processing unit 206 may monitor the events at network node 200 periodically to determine whether a triggering event has occurred or not. In another variant, process 403 is not performed. Therefore, the direction of an antenna element is not required to be changed.

Figure 5:
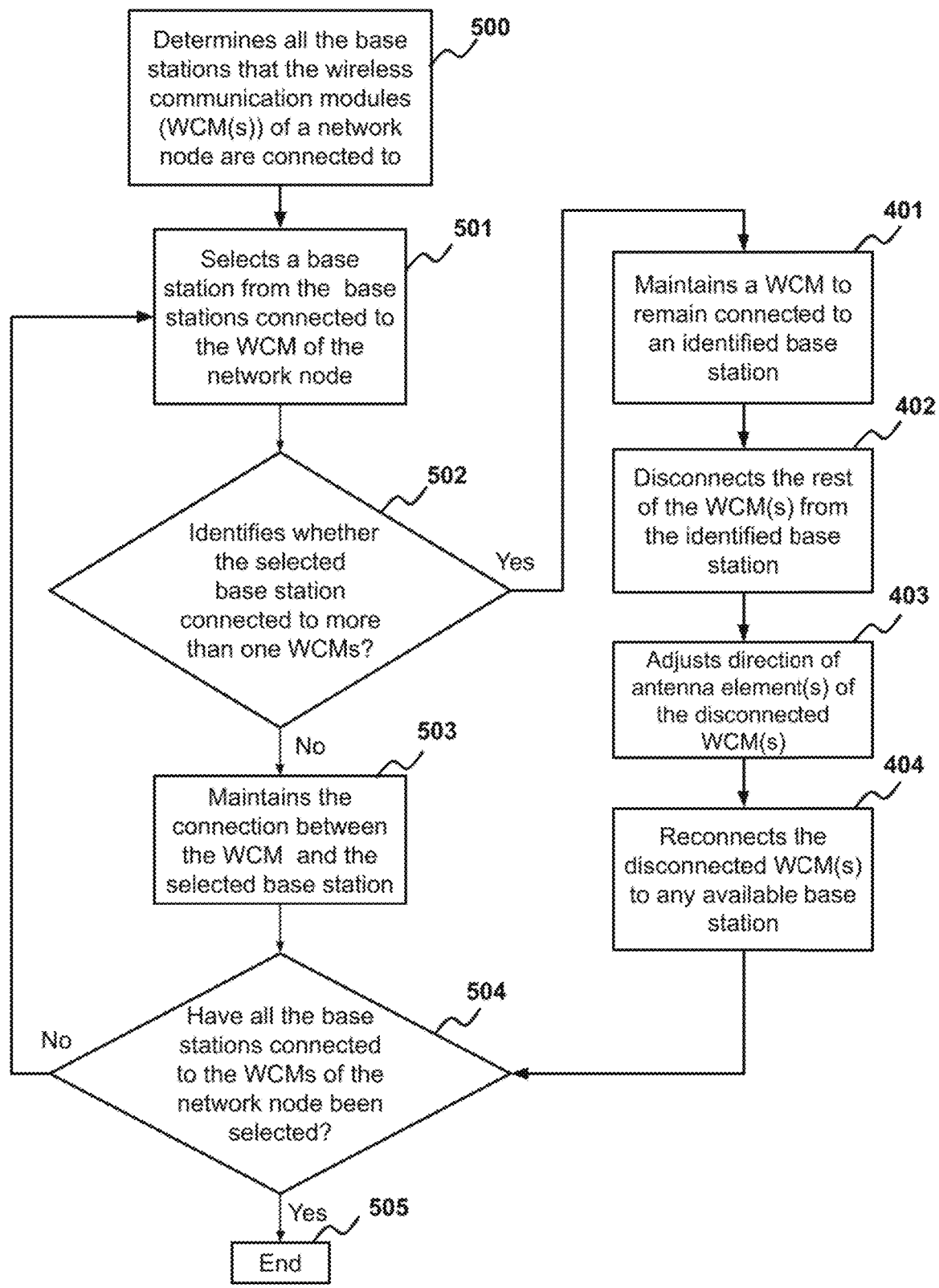
FIG. 5 is a flowchart illustrating a method for improving connectivity for a network node that is connected to a base station using more than one WCMs through the same frequency band.

FIG. 5 is a flowchart illustrating a method for improving connectivity for a network node that is connected to a base station using more than one WCMs through the same frequency band. FIG. 5 is similar to FIG. 4, however, in FIG. 5 additional processes are performed to determine whether the base station is connected to more than one WCMs. For illustration purposes, the processes disclosed in FIG. 5 are performed in network node 200. The processes disclosed in FIG. 5 are also applicable for network node 210.

In process 500, processing unit 206 of network node 200 determines all the base stations connected to the plurality of WCMs housed in network node 200. In one variant, processing unit 206 also determines the base stations connected to the WCMs that are externally or remotely connected to network node 200. For illustration purposes, processing unit 206 determines all the base stations connected to WCMs 201a-e. The connected base stations of WCMs 201a-e may be determined by base station identification codes (BSICs). The BSICs may be formed by two sets of codes, including 3 bits network color code (NCC) and 3 bits base station color code (BCC). The information regarding the BSICs of WCMs 201a-e may be received by broadcast information over broadcasting control channels (BCCH) from the carriers of the connected base stations.

In process 501, processing unit 206 selects a base station from the base stations connected to WCMs 201a-e of network node 200 to determine whether the selected base station is connected to more than one WCMs. The base station selected in process 501, should be a base station that has not been selected yet. If more than one WCMs of network node 200 are connected to the selected base station, processes 401-404 are performed. After that, process 504 is performed followed by process 404. Details of processes 401-404 are discussed in FIG. 4.

However, if only one WCM is connected to the selected base station, processing unit 206 maintains the connection between the selected base station and the WCM as disclosed in process 503.

In process 504, processing unit 206 determines whether all the base stations connected to WCMs 201a-e are selected at least once. If all the base stations connected to WCMs 201a-e are selected at least once, then the method illustrated in FIG. 5 terminates at process 505. If all the base stations connected to WCMs 201a-e are not selected at least once, then process 501 is performed again to select another base station from the base stations connected to any of the WCMs 201a-e and then the subsequent processes are iterated until all the identified base stations are selected at least once. In one variant, the method illustrated in FIG. 5 restarts periodically after a certain time interval.

Figure 6:
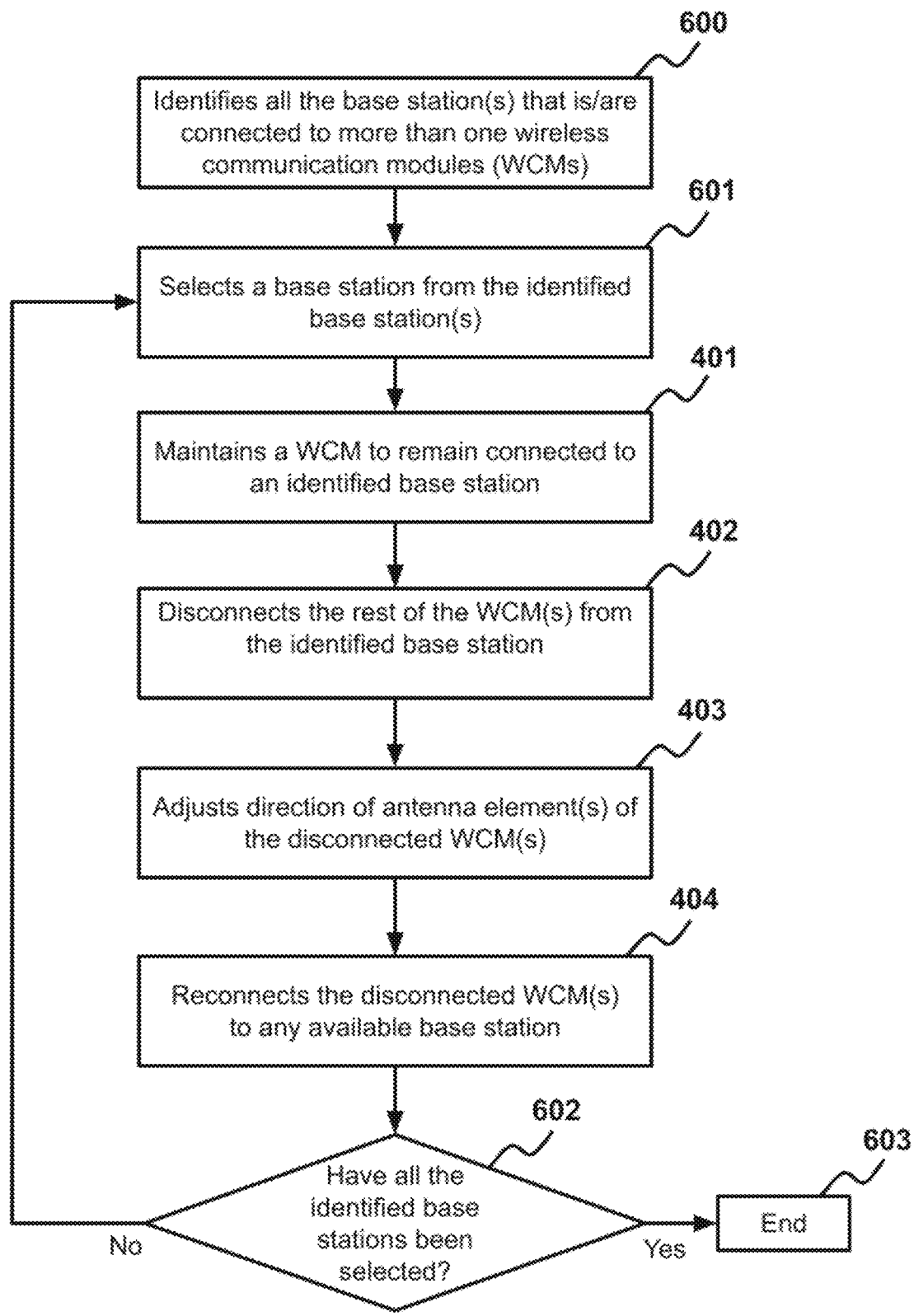
FIG. 6 is a flowchart illustrating a method for improving connectivity for a network node that is connected to a base station using more than one WCMs through the same frequency band.

FIG. 6 is a flowchart illustrating a method for improving connectivity for a network node that is connected to a base station using more than one WCMs through the same frequency band. For illustration purposes, the processes disclosed in FIG. 6 are performed in network node 200. The processes disclosed in FIG. 6 are also applicable for network node 210.

In process 600, processing unit 206 of network node 200 identifies all the base station(s) that is/are connected to more than one WCMs of network node 200. In process 601, processing unit 206 selects a base station from the identified base stations when more than one base stations are identified and then performs processes 401-404. Details of processes 401-404 are discussed in detail in FIG. 4.

On the other hand, when only one base station is identified as being connected to a plurality of WCMs of the network node 200, then process 601 may be omitted and the following processes are performed. In another scenario, when no base station is identified as being connected to a plurality of WCMs of network node 200, then the method disclosed in FIG. 6 is terminated. However, for illustration purposes, it is supposed that more than one base stations are identified as being connected to a plurality of WCMs of network node 200.

In process 602, processing unit 206 determines whether all the identified base stations are selected at least once. If all the identified base stations are selected at least once, then the process terminates at process 603. If all the identified base stations are not selected, then process 601 is performed again to select another base station from the identified base stations and the subsequent processes are iterated until all the identified base stations are selected at least once.

In one variant, processing unit 206 may determine whether each of the plurality of WCMs connected to the selected base station satisfies one or more conditions before process 401. To determine if the selected frequency band is satisfactory for communication, SNR, SINAD, SIR, SINR and RSSI levels for the selected frequency band are evaluated. The determination may be applied before process 401 in the embodiments as illustrated in FIG. 4, FIG. 5 and FIG. 6.

In one variant, after a threshold number of iterations, processing unit 206 does not perform steps 401-404. The threshold number of iterations may be pre-configured by the manufacturer of network node 200, entered by an administrator of network node 200 or retrieved from a remote server connected to network node 200. The threshold number of iterations is to avoid the processing unit 206 performing steps 401-404 for too long as in some scenarios it is possible that a base station is still connected to more than one WCMs 201. This scenario may happen when the number of base stations is smaller than the number of WCMs of a network node.

When more than one WCMs in network node 200 are connected to a base station, such as base station 106c, processing unit 206 allows only one of the WCMs to maintain the connection with the base station according to the conditions.

In one embodiment, only the connection with the WCM having the highest SNR is maintained. Antenna elements 203 of the rest of WCMs 201 will be disconnected from base station 106c. For example, WCMs 201b and 201c are connected to base station 106c via antenna elements 203b and 203c respectively. Antenna element 203b receives the signal with the highest SNR compared with antenna element 203c. Hence, processing unit 206 allows WCM 201b, which is connected to antenna element 203b, to maintain the connection with base station 106. WCM 201c is disconnected from base station 106c. Processing unit 206 may reconnect the disconnected WCM 201c to a base station as disclosed in FIG. 4.

In one variant, one or more antenna elements 203 are allowed to remain connected with base station 106c when receiving a signal with SNR being higher than a threshold SNR level. The threshold SNR level may be set by processing unit 206 as a predetermined value.

Figure 7:
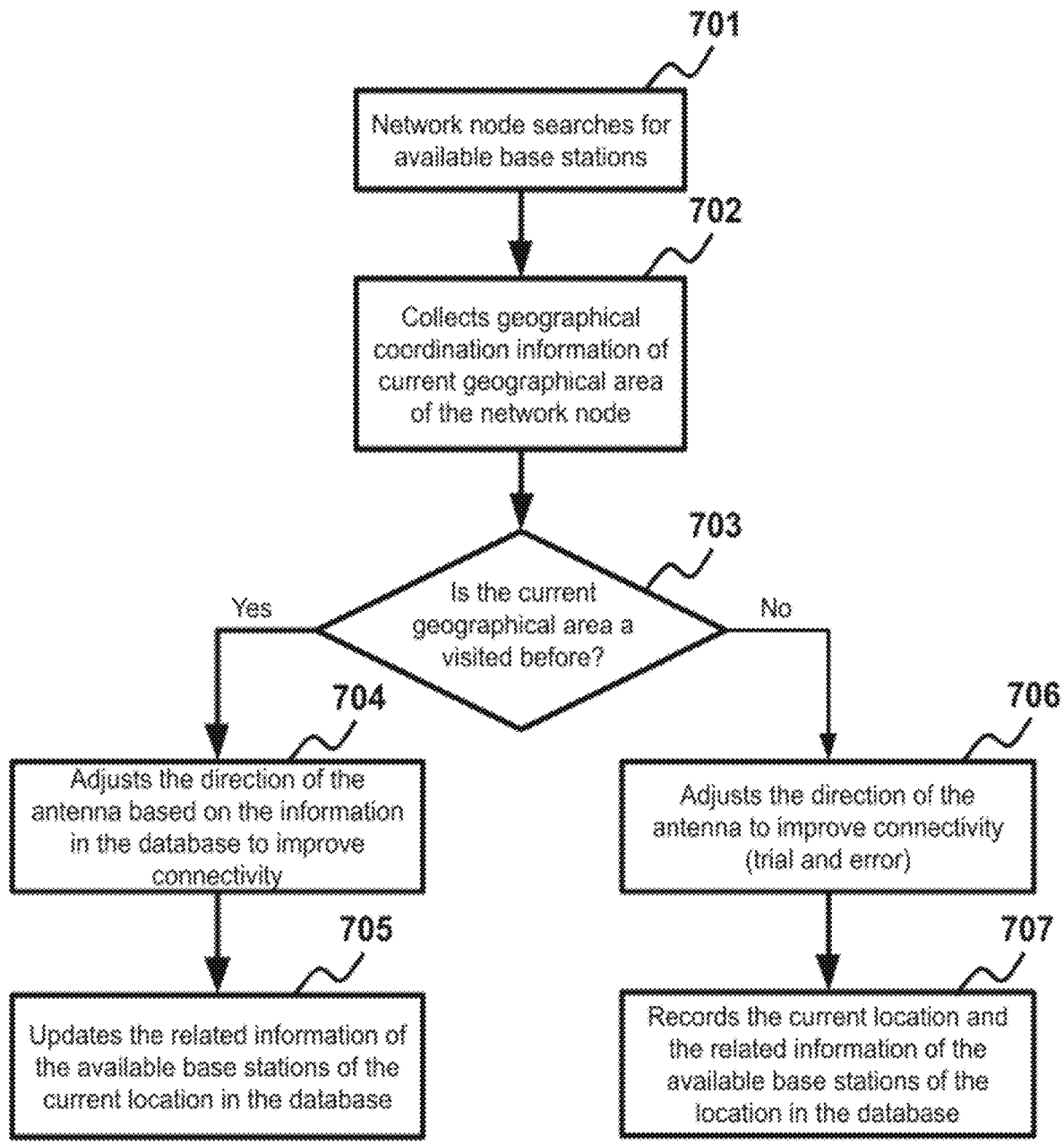
FIG. 7 is a process flowchart illustrating a method for improving connectivity for a network node connected to a base station.

FIG. 7 is a process flowchart illustrating a method for improving connectivity for a network node connected to a base station. The network node is placed in a moving vehicle and continuously searches for the available base stations of an MNO corresponding to a SIM that is not connected to a base station. The SIM is all or part of a plurality of SIMs housed in the network node. For illustration purposes, the network node is network node 200 and the plurality of SIMs are SIMs 202.

In one variant, if the SIM is an eSIM, the moving vehicle continuously searches for base stations corresponding to the MNO specific information stored in one or more eSIM profiles of the eSIM.

Network node 200 may further comprise a global positioning system (GPS) which allows the user or the administrator to determine geographical coordination information of the base stations. Then the geographical coordination information of the base stations may be stored in a database of network node 200 in order to avoid the hassle of retrieving and verifying information every time when network node 200 visits the same geographical area along a certain route and tries to establish connections with the same base station. The geographical coordination information may include, but not limited to, latitude and longitude related information of a network node in a geographical area. In one variant, data communication performance information of each available base station of a geographical area is also recorded in the database when the vehicle housing the network node visits the geographical area for the first time. The communication performance information may be achieved by running test data communication over each base station of the geographical area. Hence, when the network node detects the vehicle that is housing the network node is visiting the same geographical area again, the network node automatically connects to a base station of that geographical area based on the performance information from the database. Therefore the method disclosed herein will reduce the time of establishing a connection with the best performing base station in a visited geographical area. Further, the method will save the energy and resources to search for base stations and to decide on a best performing base station of a visited geographical area.

In process 701, processing unit 206 of network node 200 searches for available base stations based on the MNOs of the available SIM cards. For example, SIMs 202d and 202f are provided by MNOs AT&T® and Verizon® respectively. WCM 201d is not connected to any base stations and is connected to SIMs 202d and 202f. Network node 200 may only search for the base stations providing connections from AT&T® and Verizon®.

In process 702, processing unit 206 of network node 200 collects current geographical coordination information of network node 200. In one variant, processing unit 206 collects other related information along with the geographical coordination information. The related information may include, beam width and output strength of a base station, the distance between the base station and the network node, the size of a service area, geographical area information of a service area, connection information, and optimization information.

In process 703, processing unit 206 compares the current geographical coordination information of network node 200 with the data stored in a database to determine if the vehicle is revisiting the same geographical area again. The database may be a database stored in secondary storage 205 of network node 200, or a database reachable through the Internet. In one example, the current geographical area is matched if the latitude and the longitude are the same as the records in the database.

In one variant, the current geographical area is matched if the distance or the displacement between the current geographical coordination and the geographical coordination recorded in the database is within a predetermined value. For example, if the difference in latitude or longitude information between the records and the current geographical area is less than a threshold distance, then the current geographical area is still regarded as visited before. If the latitude of the current geographical area is the same as a record in the database, and the difference between the corresponding longitude and the longitude of the current geographical area is less than the threshold distance, then the current geographical area is still regarded as visited before.

In process 704, if the geographical area is visited before, the direction of the antenna element is adjusted based on the information stored in the database to improve connectivity. After that, processing unit 206 updates the related information of the available base stations of the current geographical area in the database in process 705. If the geographical area is not visited before, then at least one antenna element connected to at least one WCM housed in network node 200, is adjusted to improve connectivity by trial and error method in process 706. After that, in process 707, the current geographical coordination information of network node 200 and the related information of available base stations of the current geographical area is recorded in the database.

In one variant, characteristics information of different antenna elements connected to the WCMs housed in network node 200 are also stored in the database. The characteristics information of the antenna elements may include, for example, gain (dbi), impedance, radiation pattern, beam width and polarization of antenna elements 203. There is no limitation on the types of characteristics information of the antenna elements that are stored in the database. The characteristics information may be the identified MNO, model number and/or the serial number of the antenna elements etc.

In one variant, each of the base stations is capable of providing wireless communication in its coverage area through a plurality of frequency bands. The number of available frequency bands may vary according to one or more of the following: MNO, the frequency band that the network node supports, regions and the regulation of the countries. For example, when network node 200 is connecting to base station 106c, processing unit 206 may limit the number WCMs connecting to base station 106c through the same available frequency band. For illustrative purposes, only one WCM is allowed to connect with base station 106c through the same frequency band.

Figure 8:
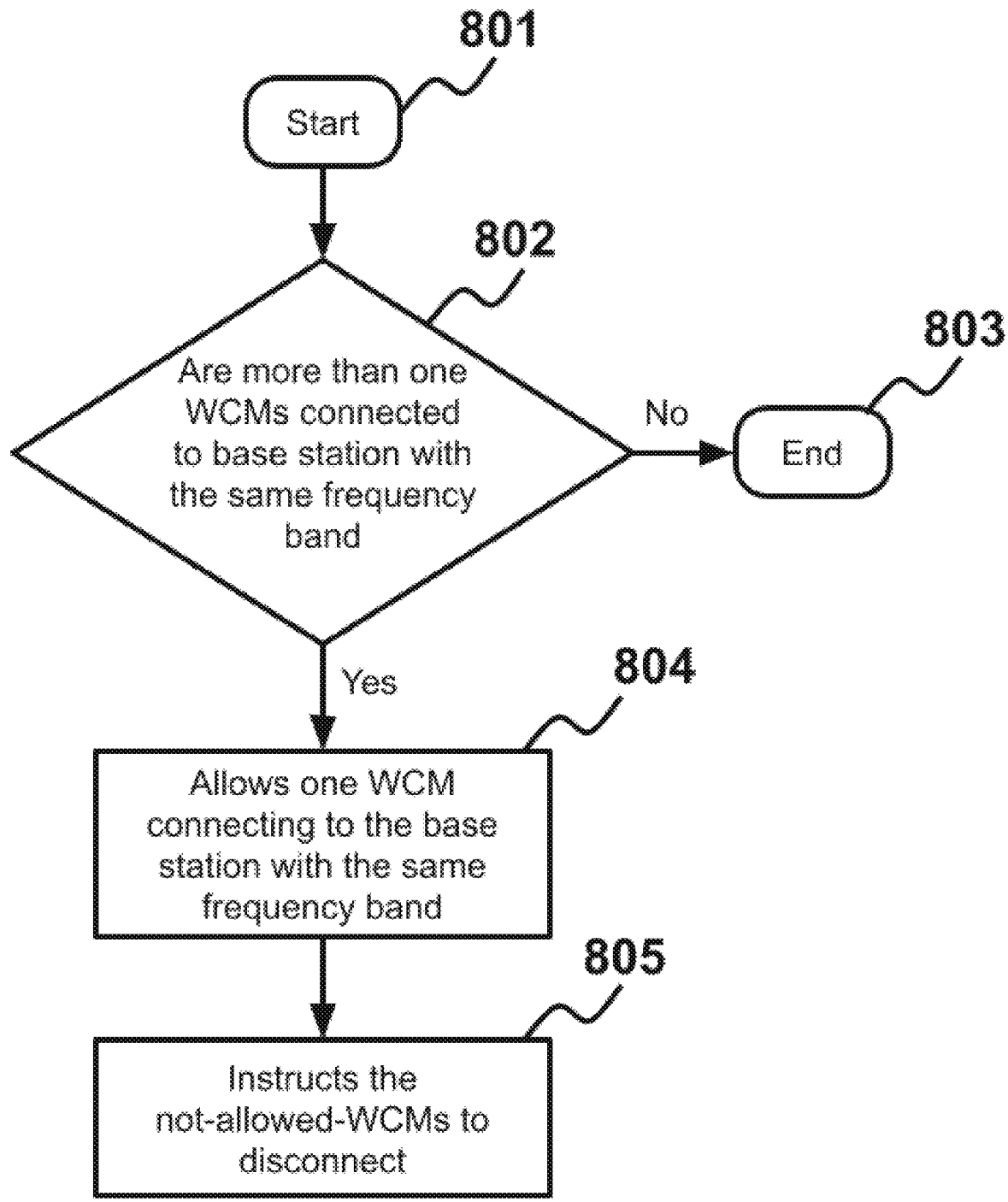
FIG. 8 is illustrating a method for improving the connectivity for a network node connected to a base station according to one embodiment of the present invention.

FIG. 8 is illustrating a method for improving the connectivity for a network node connected to a base station according to another embodiment of the present invention. The method illustrated in FIG. 8 is performed when more than one WCMs are connected to a base station, which may be replaced by processes 401-404 disclosed in FIG. 5 and FIG. 6. Only one frequency band is available in processes 401-404 as shown in FIG. 5 and FIG. 6.

In process 801, the method starts when more than one WCMs 201 are connected to a base station. The base station may be the selected base station as illustrated in process 502 or the base station as illustrated in process 601. For illustrative purposes, the base station is base station 106c, which supports wireless communication services in one or more frequency bands.

In process 802, processing unit 206 may determine whether more than one WCMs 201 in network node 200 are connected to base station 106c with the same frequency band. If only a WCM is connected to base station 106c, the process ends at process 803.

If more than one WCMs 201 are identified that are connected to base station 106c with the same frequency band, in process 804, processing unit 206 only allows one WCM for connecting base station 106c with the same frequency band. In one variant, process 804 is performed when all WCMs 201 in network node 200 are connected to base station 106c with the same frequency band.

In process 805, processing unit 206 instructs the not-allowed WCMs to disconnect from base station 106c. In one variant, process 805 is performed before process 804. In another variant, processing unit 206 may further repeat steps 801 to 805 until each of available WCMs 201 is connected to a base station with different frequency bands.

There is no limitation that WCMs 201 only establishes a connection with one base station. A base station with the plurality of frequency bands used here is only for illustrative purposes. Each of the plurality of WCMs 201 may connect to different base stations with the same or different frequency bands. If more than one base stations with the plurality of frequency bands are available, processing unit 206 may consider whether a particular number of WCMs 201 in network node 200 are connected to the same base station with the same frequency band.

In one variant, WCMs 201 are grouped to a plurality of groups according to one or more grouping policy and processing unit 206 may determine whether a particular number of WCMs 201 in the same group are connected to base station 106c with the same frequency band. The one or more grouping policy may be based on one or more of the following: geographical coverage area, connection bandwidth, time, network identity, MNO, usage price and signal quality. One of the benefits of grouping WCMs 201 according to one or more grouping policies is to improve the connectivity among the WCMs in the same group. For example, if the WCMs are grouped by MNO, then all the WCMs in the same group are able to use the same frequency band for communication. There are myriad ways for grouping WCMs. There are no limitations to the number of WCMs in a group of WCMs.

SIM cards used by the same group of WCMs may be used concurrently according to the changes in network environment, for example, a change in the geographical area. In one exemplary scenario, when there is a change in the geographical area of network node 200, a switching condition may be satisfied. Network node 200, may then switch from using one group of WCMs 201 using a set of SIM cards to another group of WCMs 201 using another set of SIM cards for better network performance. The geographical area may be determined based on the signal strength of networks or network identity. The geographical area may also be determined using a global positioning system (GPS) sensor.

For illustrative purposes, WCMs 201a-b are grouped into a first group, WCMs 201c-d are grouped into a second group and WCM 201e is grouped into a third group.

In one example, the first group of WCMs 201a-b is used at step 802. In another example, any non-first group is used. Furthermore, any two of the three groups or all of the three groups could also be used in simultaneous or in chronological order or in any order.

In one variant, each of the plurality of WCMs 201 is used in chronological order. For example, WCMs 201a-b belonging to a first group are activated first to establish connections. Then WCMs 201c-d belonging to a second group are activated to establish connections. Then, WCM 201e belonging to a third group is activated to establish connections.

Figure 9:
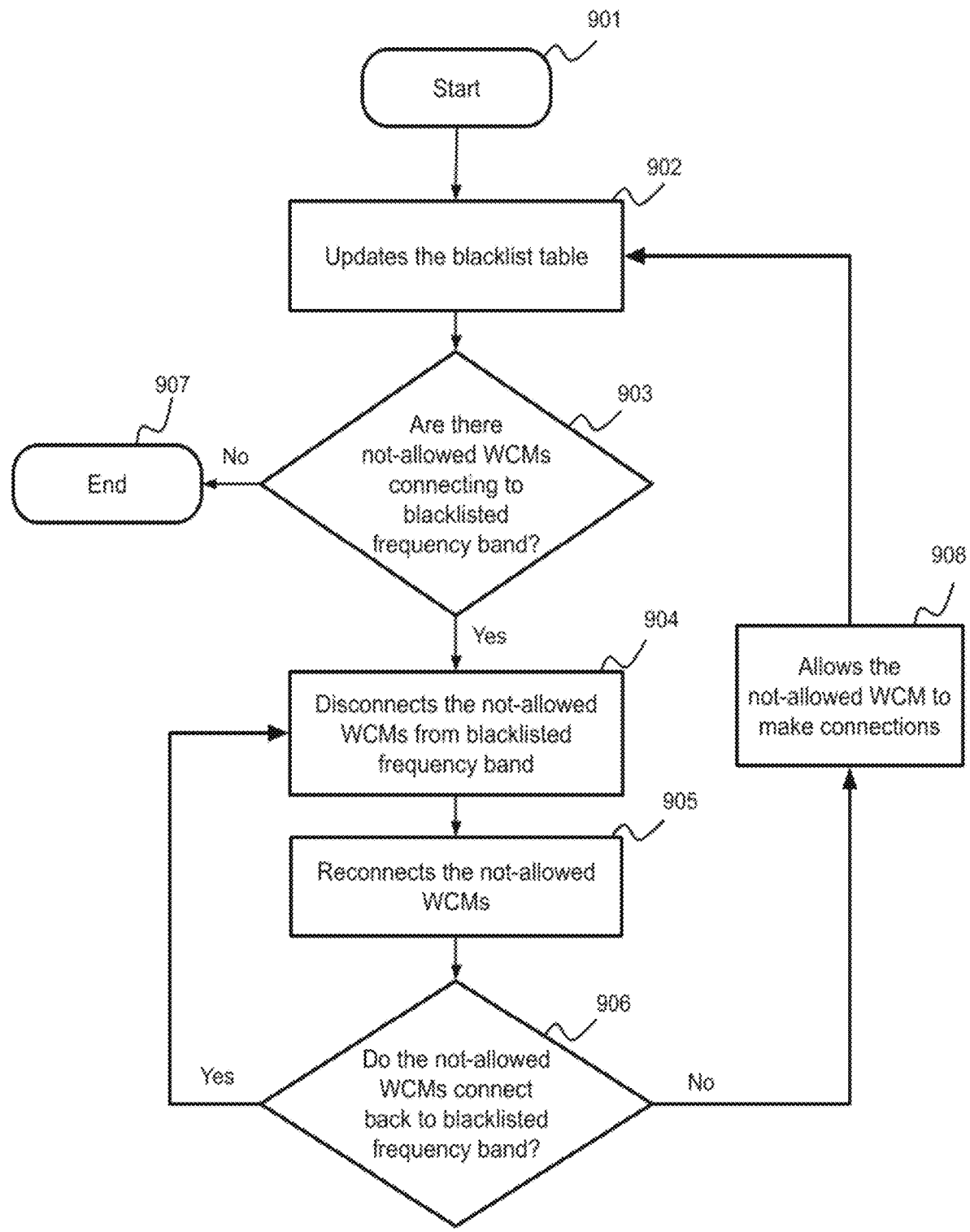
FIG. 9 illustrates a method providing a more detailed insight regarding instructions of not-allowed WCMs.

FIG. 9 illustrates a flowchart providing a more detailed insight of process 805 of FIG. 8. The processes in FIG. 9 illustrate blacklisting frequency bands such that one or more not-allowed WCMs disconnect from a base station when the blacklisted frequency band is used for connecting to the base station. Only one base station is used for illustrative purposes. If more base stations need to be considered during blacklisting, the combination of the base station and the frequency bands should be considered rather than considering the frequency bands only.

The processes start at process 901. When processing unit 206 determines that the not-allowed WCMs are connecting to a base station, processing unit 206 may disconnect the WCMs from the base station. For example, after process 802, a decision is taken to allow only WCM 201b to stay connected to base station 106c with frequency band B1. After that, frequency band B1 is stored in a blacklist table since a WCM is already connected to base station 106c using frequency band B1. When frequency band B1 is blacklisted, no other WCMs are allowed to stay connected to base station 106c with frequency band B1. The blacklist table is stored in network node 200 by a user or administrator comprising data and information in order to disconnect not-allowed WCMs from the base station. The data and information are related to the frequency bands, WCMs and/or base stations.

In process 902, processing unit 206 updates the blacklist table by updating the blacklisted frequency bands. In process 903, processing unit 206 determines if there are any not-allowed WCMs connecting to the base station with the blacklisted frequency band(s). If processing unit 206 determines that none of the not-allowed WCMs is connected to the blacklisted frequency band(s), the processes end at process 907.

In process 904, if processing unit 206 determines that one or more not-allowed WCMs are connecting to the blacklisted frequency band(s), processing unit 206 disconnects the not-allowed WCMs from the blacklisted frequency band.

In process 905, the not-allowed WCMs are configured in order to establish connections again. Since WCMs 201 may not be capable of selecting a frequency band for connecting to, it may happen that one or more of the not-allowed WCMs connect back to a blacklisted frequency band. Therefore, there is no limitation that the not-allowed WCMs may not connect back to a blacklisted frequency band.

In one variant, each of the not-allowed WCMs is enforced to connect to the base station with a frequency band, which is not on the blacklisted table. In one example, the frequency bands may be set using AT commands.

In another example, the frequency bands may be set using QMI protocols. For example, in order to set a frequency band for WCM 201, libqmi, a QMI protocol related library, may be used to communicate with WCM 201 under the category of 'Network Access (NAS) Set System Selection Preference request":

qmi_message_nas_set_system_selection_preference_input_set_extend_lte_band_preference (
qmiMessageNasSetSystemSelectionPreferenceInput *self,

```
guint64 value_extended_lte_band_preference_mask_low,
guint64 value_extended_lte_band_preference_mask_mid_low,
guint64 value_extended_lte_band_preference_mask_mid_high,
guint64 value_extended_lte_band_preference_mask_high,
gError **error);
```

In process 906, processing unit 206 determines whether a not-allowed WCM has reconnected to a blacklisted frequency band or not. If processing unit 206 determines that one of the plurality of not-allowed WCMs 201 have reconnected to a blacklisted frequency band, processing unit 206 repeats processes 904 to 906 until the not-allowed WCM connects to a non-blacklisted frequency band. If processing unit 206 determines that one of the plurality of not-allowed WCMs 201 have reconnected to a non-blacklisted frequency band, processing unit 206 repeats process 902 to 907 until each of the plurality of WCMs 201 being used is connected to a base station with non-blacklisted frequency bands.

In process 907, the processes end when processing unit 206 determines that each of the not-allowed WCMs has established connections with a non-blacklisted frequency band. In one variant, processing unit 206 may terminate at process 904 and not perform the remaining processes after process 904.

FIG. 10 is a blacklist table that illustrates different WCMs connecting to a base station in different cycles through the same or different frequency bands. Processing unit 206 performs processes 801-805 for each cycle.

For illustrative purposes, the blacklist table is created by processing unit 206. FIG. 10 should be viewed in conjunction with FIG. 9. The blacklist table is maintained by processing unit 206 and may be stored as a database in a storage medium, such as secondary storage 205 of network node 200. Alternatively, the blacklist table may be stored in a remote server which can be accessed by network node 200 through Internet 100.

FIG. 10 illustrates three cycles of blacklisting frequency bands when a plurality of WCMs connects to a base station. For illustrative purposes, the blacklisting frequency band is performed in three cycles for three WCMs with three frequency bands.

For each cycle, the number of iterations is indicated under column 1001. Column 1002 indicates the available WCMs that may establish wireless connections with the base station through different frequency bands. Column 1003 indicates frequency band(s) used by WCMs 201 for connecting to the base station during that cycle. Column 1004 indicates the status of the WCMs after an attempt by the WCMs to connect to the base station with the frequency bands in that cycle. Column 1005 indicates the collective status of the WCMs after the WCMs are attempting to connect to the base station with the frequency bands in that cycle. Column 1006 indicates the blacklisted frequency bands after the WCMs are attempting to connect to the base station with the frequency bands in that cycle.

During the first cycle, WCMs 201a-c are available to establish connections with a base station, such as base station 106a. In view of process 802 of FIG. 8, processing unit 206 may further perform process 804 only if more than one WCMs are connected to the base station with the same frequency band. For illustrative purposes, only WCM 201a connects to base station 106a in cycle 1 through frequency band B1. Processing unit 206 then allows WCM 201a to stay connected to the base station 106a through frequency band B1 in process 804. Cells 1004a and 1005a show the status and the collective status of WCMs 201a-c after the cycle.

In process 805, processing unit 206 blacklists frequency band B1 to avoid not-allowed WCMs 201b-c connecting to base station 106a using frequency band B1. The blacklisted frequency band is updated in process 902, and shown in cell 1006a. Processing unit 206 then disconnects WCMs 201b-c from the base station.

During the second cycle, WCMs 201b-c are available to establish connections with base station 106a. For illustrative purposes, WCM 201c is connected to base station 106a through frequency band B1, and WCM 201b is connected to base station 106a through frequency band B2. Since frequency band B1 becomes a blacklisted frequency band after cycle 1, processing unit 206 may disconnect WCMs 201c from base station 106a. Processing unit 206 may allow the connection between WCMs 201b and base station 106a to stay connected as frequency band B2 is not listed on the blacklist table. Cells 1004b and 1005b show the status of WCMs 201a-b and the collective status of WCMs 201a-c after the cycle respectively.

During the third cycle, WCM 201c may establish another connection with base station 106a through frequency band B3. For illustrative purposes, WCM 201c is connected to base station 106a through frequency band B3. Processing unit 206 may allow the connection between WCMs 201c and base station 106a to stay connected as frequency band B3 is not listed on the blacklist table. Cells 1004c and 1005c show the status of WCM 201c and the collective status of WCMs 201a-c after the cycle.

In one variant, combinations of frequency bands and the base stations are considered instead of only considering frequency bands. The combinations of frequency bands and the base stations are considered in the same or separate blacklist table(s). There is no limitation on how many cycles are performed for the processes illustrated in FIG. 8 and FIG. 9. For illustrative purposes, only 3 cycles are performed as shown in FIG. 10.

Figure 11:
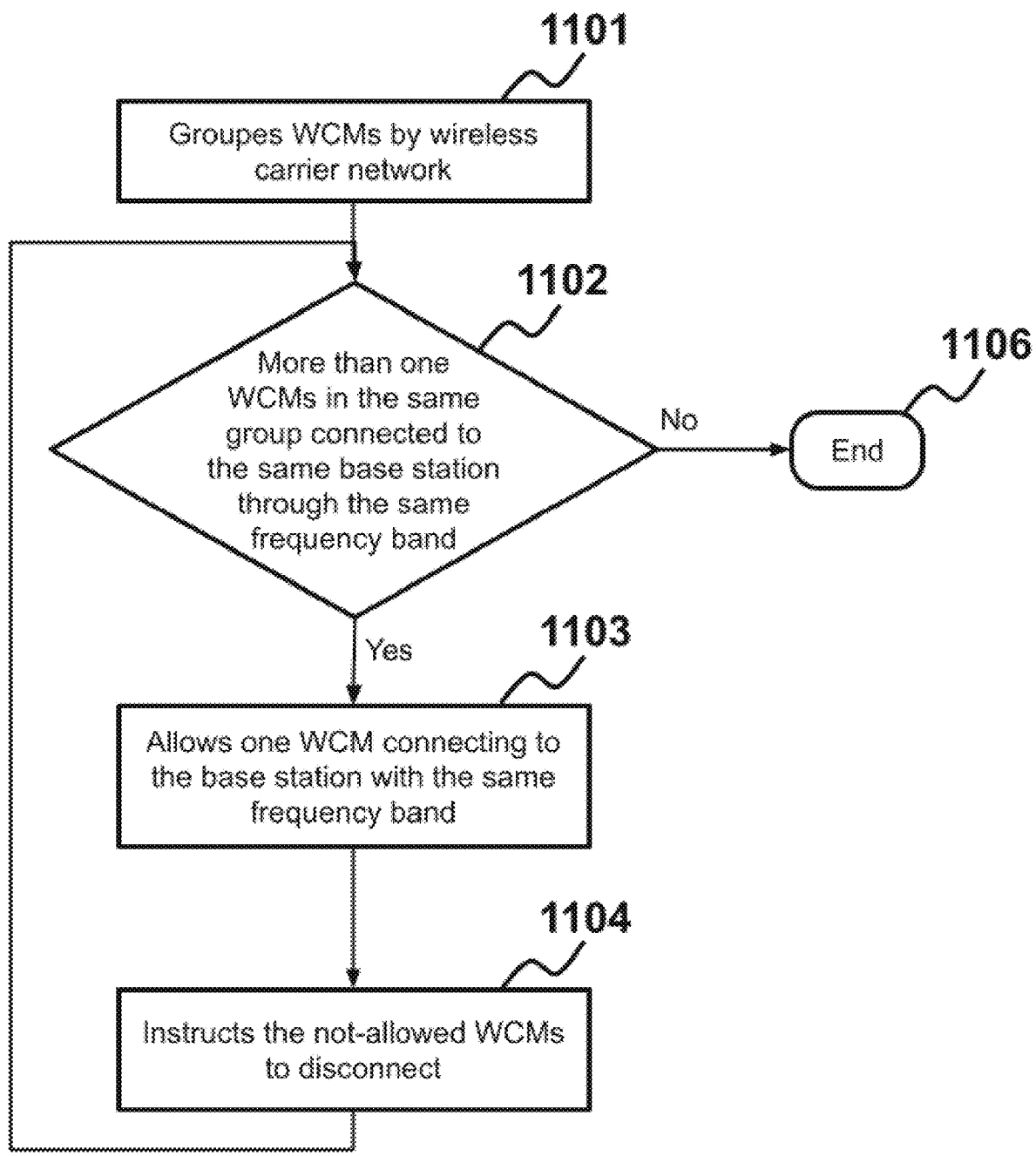
FIG. 11 illustrates a flowchart for one of the embodiments of the present invention.

FIG. 11 is a flowchart illustrating a process according to one of the embodiments of the present invention. As mentioned before, it is possible to group WCMs into different groups. In process 1101, WCMs 201 are grouped according to MNO. For example, WCMs 201a-b are grouped in a first group if SIMs 202a-b are provided by MNO AT&T®; WCMs 201c-d are grouped in a second group if SIMs 202c-d are provided by Verizon®; and WCM 201e belongs to a third group if the SIM 202e is provided by Sprint®. There is no limitation on which group may be labelled as the first group, second group or third group.

In process 1102, for each of the plurality of WCMs 201 in the same group, processing unit 206 identifies more than one WCMs connected to the same base station through the same frequency bands according to the identification information. Identification information may include operator ID, base station ID and frequency related information.

As illustrated before, QMI protocols may also be implemented here for identifying operator ID and base station ID using libqmi. For example, in order to identify a base station ID for base station that a WCM connected to, libqmi may be used to communicate with WCM 201 under the category of 'NAS Set System Selection Preference request":

```
qmi_indication_nas_serving_system_output_get_cid_3gpp
   (QmiIndicationNasServingSystemOutput *self,
   guint32 *cid_3gpp,
   GError **error);
```

If processing unit 206 determines none of the plurality of WCMs 201 is connecting to the same base station through the same frequency band, the processes then end at process 1106.

In process 1103, if processing unit 206 determines that more than one WCMs 201 are connected to the same base station through the same frequency band, processing unit 206 only allows one of the plurality of WCMs 201 connecting to the same base station with the same frequency band. In process 1104, processing unit 206 further instructs the not-allowed WCMs to be disconnected from the base station.

The embodiments were chosen and described in order to best explain the principles of the invention and its practical applications, and thereby, enable others skilled in the art to best utilize the invention and the various embodiments with various modifications as are suited to the particular use contemplated.

The invention claimed is:

1. A method for improving data transmission at a network node, the method comprising:
    (a) when a second plurality of wireless communication modules (WCMs) in a first plurality of WCMs of the network node is connected to one base station in a plurality of base stations, identifying the one base station by determining the plurality of base stations connected to the first plurality of WCMs;
    (b) selecting, based on at least one condition, one WCM in the second plurality of WCMs;
    (c) maintaining one connection with the one base station using the one WCM selected at step (b);
    (d) disconnecting the rest of the second plurality of WCMs, except for the one WCM selected at step (b), from the one base station;
    (e) detecting at least one base station in the plurality of base stations;
    (f) adjusting, based on information, directions of antenna elements of the rest of the second plurality of WCMs towards the at least one base station via an input interface; and
    (g) connecting the rest of the second plurality of WCMs to the at least one base station in the plurality of base stations, except for the one base station;
    wherein:
        each WCM in the first plurality of WCMs comprises at least one antenna element; and
        the at least one antenna element is a directional antenna, and is rotatable and tiltable.

2. The method of claim 1, wherein the input interface is one of: a web interface, a user interface, an application programming interface, and an input device.

3. The method of claim 1, wherein the at least one antenna element is one of: a multiple-input multiple-output (MIMO) antenna, a multiple-input single-output (MISO) antenna, a single-input multiple-output (SIMO) antenna, and a single-input single-output (SISO) antenna.

4. The method of claim 1, wherein the one WCM and the rest of the second plurality of WCMs support different frequency bands.

5. The method of claim 1, wherein the at least one condition is based on at least one of: connectivity, performance, and availability.

6. The method of claim 1, wherein the information is stored in a database of the network node.

7. The method of claim 6, wherein the information comprises at least one of: geographical coordination information of the plurality of base stations, performance information of each available base station of a geographical area, and characteristics information of antenna elements.

8. The method of claim 1, wherein the determination of the plurality of base stations is performed by the network node using Base Station Identification Codes (BSICs).

9. A non-transitory computer-readable storage medium storing thereon instructions that, in response to execution by at least one processing unit of a network node, causes the at least one processing unit to:
    (a) when a second plurality of wireless communication modules (WCMs) in a first plurality of WCMs of the network node is connected to one base station in a plurality of base stations, identify the one base station by determining the plurality of base stations connected to the first plurality of WCMs;
    (b) select, based on at least one condition, one WCM in the second plurality of WCMs;
    (c) maintain one connection with the one base station using the one WCM selected at step (b) and one Subscriber Identity Module (SIM);
    (d) disconnect the rest of the second plurality of WCMs, except for the one WCM selected at step (b), from the one base station;
    (e) detect at least one base station in the plurality of base stations;
    (f) adjust, based on information, the directions of antenna elements of the rest of the second plurality of WCMs towards the at least one base station via an input interface; and
    (g) connect the rest of the second plurality of WCMs to the at least one base station using more than one SIM, except for the one base station;
    wherein:
        each WCM in the first plurality of WCMs comprises at least one antenna element;
        the at least one antenna element is a directional antenna, and is rotatable and tiltable;
        the network node is configured to house a plurality of SIMs; and
        the one SIM and the more than one SIM are in the plurality of SIMs.

10. The non-transitory computer readable storage medium of claim 9, wherein:
    the plurality of SIMs is connected to the first plurality of WCMs via a selector;
    each WCM in the first plurality of WCMs is configured to select a SIM in the plurality of SIMs using the selector; and
    each SIM in the plurality of SIMs includes an Access Point Name (APN) configuration to be used by each WCM in the plurality of WCMs to connect to the plurality of base stations.

11. A network node, comprising:
at least one processing unit;
a first plurality of wireless communication modules (WCMs); wherein each WCM in the first plurality of WCMs comprises at least one antenna element; and
at least one non-transitory computer readable storage medium for storing program instructions executable by the at least one processing unit for:
(a) when a second plurality of WCMs in the first plurality of WCMs is connected to one base station in the plurality of base stations, identifying the one base station by determining the plurality of base stations connected to the first plurality of WCMs;
(b) selecting, based on at least one condition, one WCM in the second plurality of WCMs;
(c) maintaining one connection with the one base station using the one WCM selected at step (b);
(d) disconnecting the rest of the second plurality of WCMs, except for the one WCM selected at step (b), from the one base station;
(e) detecting at least one base station in the plurality of base stations;
(f) adjusting, based on information, directions of antenna elements of the rest of the second plurality of WCMs towards the at least one base station via an input interface; and
(g) connecting the rest of the second plurality of WCMs to the at least one base station in the plurality of base stations, except for the one base station;
wherein the at least one antenna element is a directional antenna, and is rotatable and tiltable.

12. The network node of claim 11, wherein the input interface is one of: a web interface, a user interface, an application programming interface, and an input device.

13. The network node of claim 11, wherein the at least one antenna element is one of: a multiple-input multiple-output (MIMO) antenna, a multiple-input single-output (MISO) antenna, a single-input multiple-output (SIMO) antenna, and a single-input single-output (SISO) antenna.

14. The network node of claim 11, wherein the one WCM and the rest of the second plurality of WCMs support different frequency bands.

15. The network node of claim 11, wherein the at least one condition is based on at least one of: connectivity, performance, and availability.

16. The network node of claim 11, wherein the information is stored in a database of the network node.

17. The network node of claim 16, wherein the information comprises at least one of: geographical coordination of the plurality of base stations, performance information of each available base station of a geographical area, and characteristics information of antenna elements.

18. The network node of claim 11, wherein the determination of the plurality of base stations is performed by the network node using Base Station Identification Codes (BSICs).

* * * * *